US008645679B2

(12) United States Patent
Ferracane et al.

(10) Patent No.: US 8,645,679 B2
(45) Date of Patent: Feb. 4, 2014

(54) SYSTEM AND METHOD FOR MERGING SECURITY CONSTRAINTS WHEN USING SECURITY ANNOTATIONS

(75) Inventors: Elisa Ferracane, Austin, TX (US); Paul William Bennett, Austin, TX (US); William J. O'Donnell, Fichburg, WI (US); Ajay Reddy Karkala, Austin, TX (US); Ut Van Le, Austin, TX (US); Michael Craig Thompson, Austin, TX (US); Maxim Avery Moldenhauer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 13/162,744

(22) Filed: Jun. 17, 2011

(65) Prior Publication Data
US 2012/0324528 A1 Dec. 20, 2012

(51) Int. Cl.
*H04L 29/06* (2006.01)
(52) U.S. Cl.
USPC ............... 713/152; 726/1; 726/14; 726/26
(58) Field of Classification Search
USPC .......................................................... 713/152
See application file for complete search history.

(56) References Cited

U.S. PATENT DOCUMENTS

| 5,467,343 | A | 11/1995 | Lee et al. |
|---|---|---|---|
| 2004/0177244 | A1 | 9/2004 | Murphy et al. |
| 2005/0193196 | A1* | 9/2005 | Huang et al. ................. 713/166 |
| 2008/0168529 | A1 | 7/2008 | Anderson et al. |
| 2009/0055890 | A1* | 2/2009 | Anderson et al. ................. 726/1 |
| 2010/0268722 | A1* | 10/2010 | Yalamanchi et al. ......... 707/759 |
| 2012/0254383 | A1* | 10/2012 | Cosmadopoulos et al. .. 709/221 |

* cited by examiner

Primary Examiner — Kaveh Abrishamkar
(74) Attorney, Agent, or Firm — Jeffrey S. LaBaw; David H. Judson (57) ABSTRACT

A method is described for merging security constraints associated with an application when using security annotations. The application comprises one or more servlets, such as a Java servlet. During application deployment, a list of role names is generated by merging static security constraints, for example, identified in a deployment descriptor, and in a static security annotation that defines a list containing the names of authorized roles for a servlet. Later, during application runtime in an application server, security constraints are retrieved from a plurality of sources, including both dynamic and static security annotations. Using the list of role names and the security constraints retrieved, a set of merged security constraints having a defined and proper order of precedence is generated. In particular, preferably one or more dynamic security annotations are first merged with one or more static security annotations to generate a set of runtime constraints. The security constraints from the deployment descriptor are then merged with the set of runtime constraints and the list of roles to generate the set of merged security constraints. These merged security constraints are then applied to process a request being handled by the application server.

23 Claims, 5 Drawing Sheets

```
web.xml
    <web-resource-collection id="WebResourceCollection_1">
            <url-pattern>/test1</url-pattern>
        <http-method>GET</http-method>
        <auth-constraint id="AuthConstraint_1">
                <role-name>Manager</role-name>
        </auth-constraint>
        </web-resource-collection>
```

*FIG. 5*

```
    @WebServlet(name = "TestServlet2", urlPatterns={"/test2"})
    @ServletSecurity((httpMethodConstraints = {
            @HttpMethodConstraint(value = "TRACE", rolesAllowed ="All Role",
            transportGuarantee = TransportGuarantee.NONE) })
    public class TestServlet2 extends HttpServlet {.........}
```

*FIG. 6*

```
<security-constraint id="SecurityConstraint_1">
        <web-resource-collection id="WebResourceCollection_1">
            <url-pattern>/test1</url-pattern>
        <http-method>GET</http-method>
        <auth-constraint id="AuthConstraint_1">
                <role-name>Manager</role-name>
        <auth-constraint>
        <web-resource-collection>
</security-constraint>
<security-constraint id="SecurityConstraint_2">
        <role-name>All Role</role-name>
</security-constraint>
```

*FIG. 7*

ServletContextListener.java

HttpConstraintElement constraint = new
    HttpConstraintElement(EmptyRoleSemantic.DENY);
ServletSecurityElement servletSecurity = new
    ServletSecurityElement(constraint);

getServletRegistration("TestServlet2").setServletSecurity(servletSecurity)

*FIG. 8* a) Manager role is required for HTTP method get().
b) Deny all for HTTP method trace().

*FIG. 9*

SYSTEM AND METHOD FOR MERGING SECURITY CONSTRAINTS WHEN USING SECURITY ANNOTATIONS

BACKGROUND OF THE INVENTION

1. Technical Field

This disclosure relates generally to web application security and in particular to a method and system for managing security constraints in a web application environment.

2. Background of the Related Art

The Java™ Platform, Enterprise Edition (Java EE) standard supports the notion of declaring security constraints for Web-based applications using XML (outside of the application code). In addition, JEE standards put the control of security into a container, which removes the control of security from the application developer. Application developers are looking for an easier ways to declare these constraints during the development process. To this end, the Java JEE Servlet 3.0 specification (Java specification: JSR315) resolves this issue by using security "annotations." An "annotation" is a programming mechanism and, in particular, a standard way to include supported security behaviors while allowing source code and configuration files to be generated automatically. With the introduction of this specification, there are now two (2) ways to declare security constraints, namely, using a web application configuration file (web.xml), and using annotations. Moreover, annotations may be specified statically or dynamically. The static security annotations are resolved when the application is deployed, and the dynamic security annotations are resolved after the application is started.

When invoking annotations in this manner, it is necessary that a proper order of precedence by maintained. The precedence order is as follows: the security constraints declared in the XML take precedence over the dynamic and static security annotations, and the dynamic security annotations in turn take precedence over the static security annotations. If, however, metadata (for the properties in the XML security constraints and annotations) is not provided, there is no way to determine where a particular property originates if a merge (of these constraints) occurs at install time.

A known, simple solution to handling these different types of security constraints is to merge all of the security annotations once at application deployment, and once again at application start. The disadvantage of this solution is that data may not be merged correctly (i.e. the order of precedence is not maintained) because the origin of a particular property is not known with certainty. An alternative solution is to merge all of the security constraints once at runtime. The disadvantage of this solution is that a complete list of security roles defined in a servlet (whether specified through web.xml security constraints, or static security annotations) is not available at application deploy time. Thus, the entity deploying the application is not able to map a user to a certain security role.

There remains a need to handle correctly security constraints during application deployment that preserves the intent of the application developer who has declared those security constraints.

BRIEF SUMMARY

According to this disclosure, a method is described for merging security constraints associated with an application when using security annotations. The application comprises one or more servlets. During application deployment, a list of role names is generated by merging static security constraints, for example, identified in a deployment descriptor, and in a static security annotation that defines a list containing the names of authorized roles for a servlet. Later, during application runtime in an application server, security constraints are retrieved from a plurality of sources, including both dynamic and static security annotations. Using the list of role names and the security constraints retrieved, a set of merged security constraints having a defined and proper order of precedence is generated. In particular, preferably one or more dynamic security annotations are first merged with one or more static security annotations to generate a set of runtime constraints. The security constraints from the deployment descriptor are then merged with the set of runtime constraints and the list of roles to generate the set of merged security constraints. These merged security constraints are then applied to process a request being handled by the application server.

In an alternative embodiment, the above-described method is performed in an apparatus. The apparatus carries out the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
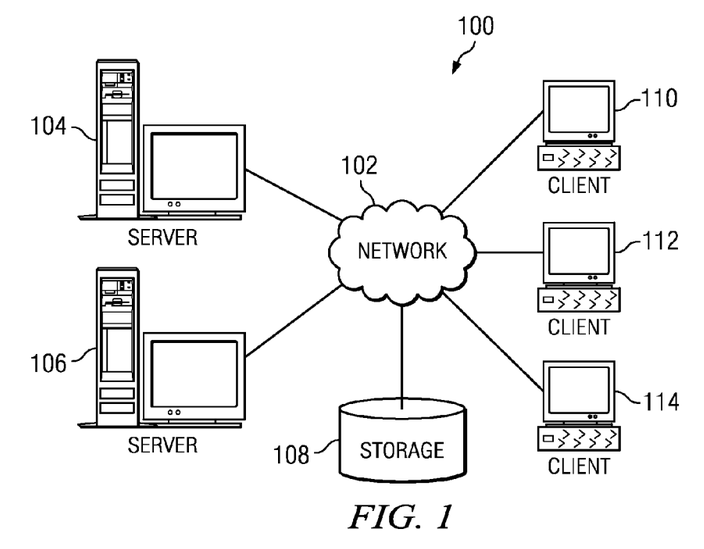
FIG. 1 depicts an exemplary block diagram of a distributed data processing environment in which exemplary aspects of the illustrative embodiments may be implemented.
Figure 2:
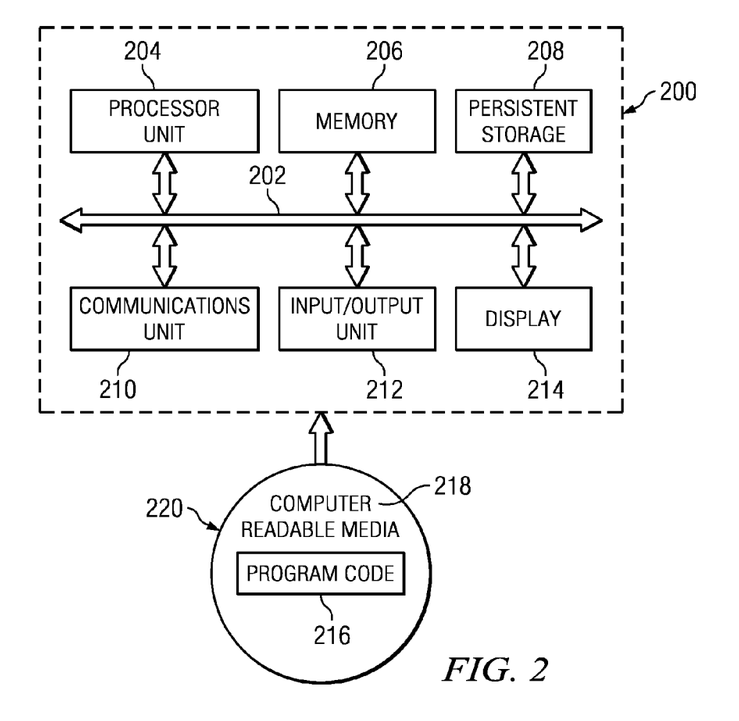
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
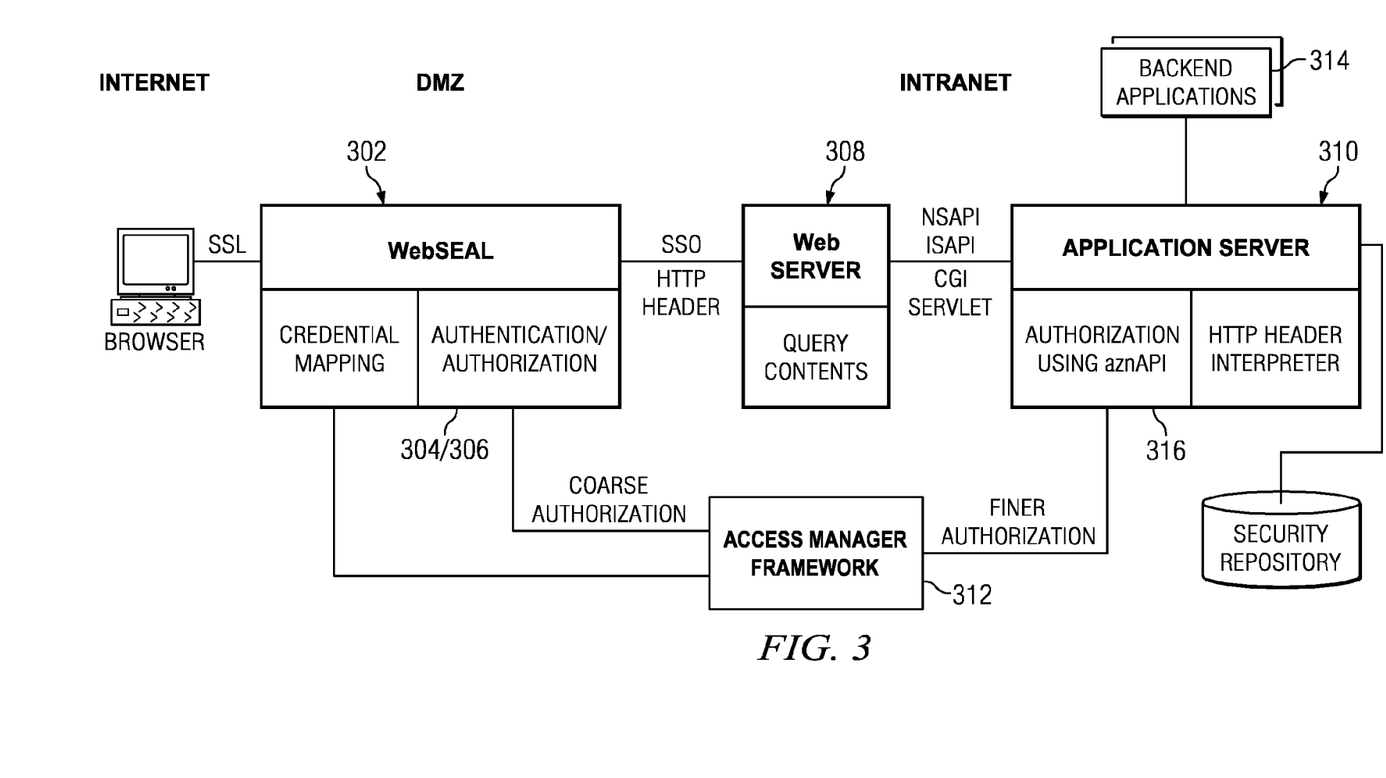
FIG. 3 illustrates a Web portal having an access management framework in which the subject disclosure may be implemented.

By way of further background, a web-based application environment such as described above typically includes a session management component. Session management typically is provided in association with an access manager, which is a component that prevents unauthorized use of resources, including the prevention of use of a given resource in an unauthorized manner. A representative access manager is the Tivoli® Access Manager for e-business (TAMeb) product, which is available commercially from IBM, and is represented in FIG. 3. Of course, the identification of this commercial product is not meant to be taken to limit the disclosed subject matter. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. This component is responsible for the session management of users.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from Web-SEAL and obtained from the access manager framework 312 can be used to make access decisions to back end applications.

TAM provides a reverse proxy, web plug-in or the like that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification.

In a representative implementation, such as shown in FIG. 3, IBM WebSphere® Application Server provides embedded IBM® Tivoli® Access Manager client technology to secure WebSphere Application Server-managed resources. Web-Sphere Application Server supports the Java Authorization Contract for Containers (JACC) specification. JACC details the contract requirements for Java EE containers and authorization providers. With this contract, authorization providers perform the access decisions for resources in Java EE application servers such as WebSphere Application Server. The Tivoli Access Manager security utility that is embedded within WebSphere Application Server is JACC-compliant and is used to add security policy information when applications are deployed, and to authorize access to WebSphere Application Server-secured resources. When applications are deployed, the embedded Tivoli Access Manager client takes any policy and or user and role information that is stored (within an application deployment descriptor or using annotations) and stores it within the Tivoli Access Manager Policy Server. The Tivoli Access Manager JACC provider is also called when a user requests access to a resource that is managed by WebSphere Application Server.

In Java™ Platform, Enterprise Edition (Java EE) 5 and above, security roles and policies can be defined using a "deployment descriptor" as well as with "annotations." Java web applications use the deployment descriptor file to determine how URLs map to servlets, which URLs require authentication, and other information. This file is named web.xml, and it is part of the servlet standard for web applications. A web application's deployment descriptor describes the classes, resources and configuration of the application and how the web server uses them to serve web requests. When the web server receives a request for the application, it uses the deployment descriptor to map the URL of the request to the code that should handle the request. An "annotation" is a programming mechanism and, in particular, a standard way to include supported security behaviors while allowing source code and configuration files to be generated automatically. During the installation of the application, the security policies and roles defined using annotations are merged with the security policies and roles defined within the deployment descriptor.

Merging Security Constraints when Using Security Annotations

With the above as background, the subject matter of this disclosure is now described. The techniques herein preferably are implemented in an application server that supports security updates as defined in the Java™ Servlet 3.0 specification (JSR315). As noted above, the application server provides annotation support for servlets. With this support, an application developer can declare security constraints using annotations as an alternative to declaring them as part of the web.xml file (the technique used prior to Java Servlet 3.0). An application developer is the person who writes the application, and who configures security constraints, so that the application can be accessed only by users mapped to a certain role. For example, the developer can define in the web.xml that only users in the Manager role can access servlet1; using an annotation, the developer can also have a static annotation that defines that only users in the Employee role can access servlet2. When the application developer is done, he or she packages up the application and gives it to the application deployer. The application deployer is the person who is responsible for installing and configuring the application on the application server, which, in one non-limiting embodiment, is IBM WebSphere Application Server v8. An application server of this type includes a deployment service that includes an administrative console. One aspect of configuring the application involves the deployer deciding what users are allowed to be part of the roles that have been defined by the application developer. Typically, the deployer does this mapping on the administrative console of the application server. In particular, the deployer is provided a list of roles that the application has defined. In the prior art, the deployer only sees role from the web.xml—Manager. With the merge technique of this disclosure, however, the deployer sees both roles—Manager and Employee, and in the proper precedence order. The deployer then can decide that, e.g., Emily, should be mapped to the Manager role, and others, e.g., Bob, Scott, and George, should be mapped to the Employee role. As a consequence, when the application is later executed (at runtime), only Emily can access servlet1, and only Bob, Scott and George can access servlet2. Without the merge, the deployer would not be able to see the Employee role, and thus appropriate access to servlet2 could not be configured.

Figure 4:
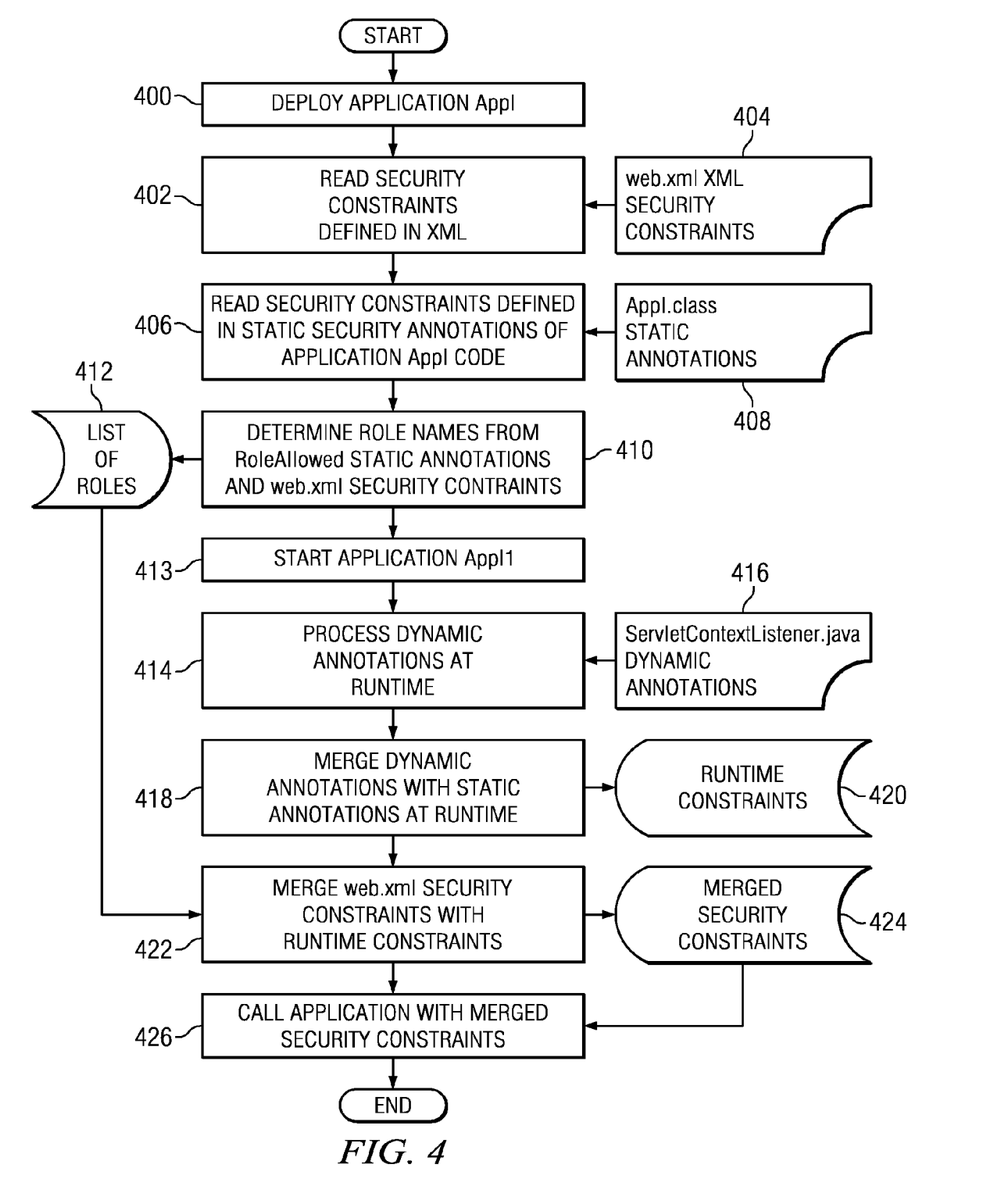
FIG. 4 is a technique for merging security constraints according to this disclosure.

According to this disclosure, a method is provided for merging security constraints associated with a web application when using security annotations. The process flow diagram in FIG. 4 illustrates the approach. The process illustrated is an integrated one, with initial steps occurring during application deployment, and additional steps occurring during application runtime (when the application is started). The routine begins at step 400 during the application deployment. At step 402, the routine reads the security constraints defined in the deployment descriptor (web.xml) 404. As noted above, these are XML-based security constraints. At step 406, the routine reads the security constraints defined in one or more static security annotations 408. Typically, the security constraints in the deployment descriptor and the static annotation(s) are declared by the application developer. The routine then continues at step 410 to perform a merge of the web.xml constraints with any @RoleAllowed static security annotations to obtain a list of roles for each servlet. In other words, when merging the web.xml security constraints with the static security annotations, the operation merges only the @RoleAllowed security annotation (from the static annotations). Further details regarding the @RoleAllowed security annotation are provided below. The result of the merge operation is a list of roles 412 that will be used during the application start (described below).

The process continues when the application is started at step 413 (i.e. at runtime). At step 414, the routine processes one or more dynamic annotations 416, which are provided, for example, by the ServletContextListener.java thread. At step 418, the routine merges the dynamic annotations with the static annotations to generate a set of runtime constraints 420. As noted above, the dynamic annotations take precedence over the static annotations. The routine then continues at step 422 to merge the XML-based security constraints (from web.xml) with both the list of roles 412 (that have been generated in step 410) as well as the set of runtime constraints 420 (that have been generated in step 418). As also noted above, the security constraints declared in the XML take precedence over the dynamic and static security annotations. By including the list of roles 412, however, the proper order of precedence can be maintained across all three (3) types of security constraints. The result is a set of merged security constraints 424. At step 426, the routine then calls the application using the merged security constraints 426 that have been generated. This completes the merging function.

As can be seen, during application deployment, all the security constraints defined in the web.xml and the static security annotations are read, and a merge is done of the web.xml constraints with only the @RoleAllowed static security annotations to obtain the list of roles for the servlet. The list of roles are defined in this manner so that, during application install, the proper role to user/group mapping can be honored. Later, when the application is started, the saved data (namely, the list of roles 412) is pulled out along with the dynamic annotations, and another merge is done at this point. Because the annotations are specified in three (3) places, the location determines precedence, and the correct precedence order is maintained.

FIGS. 5-9 provide example code illustrating how the above-described operations ensure that security constraints are merged correctly when using security annotations according to this disclosure.

Figure 5:
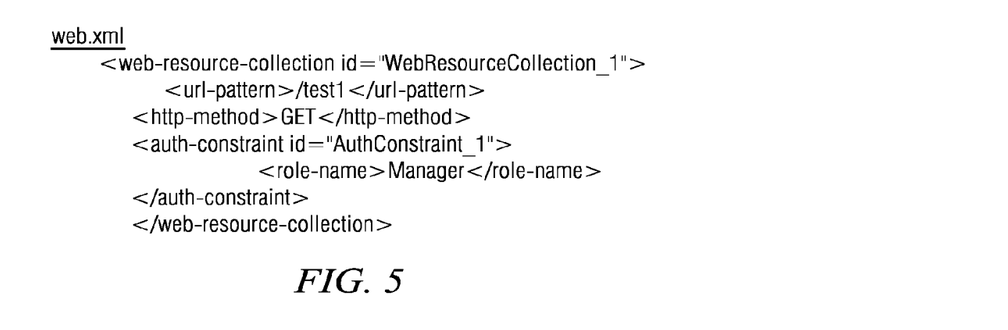
FIG. 5 illustrates a representative deployment descriptor file.

FIG. 5 illustrates a sample snippet of a portion of the deployment descriptor, the web.xml file specified by the application developer.

Figure 6:
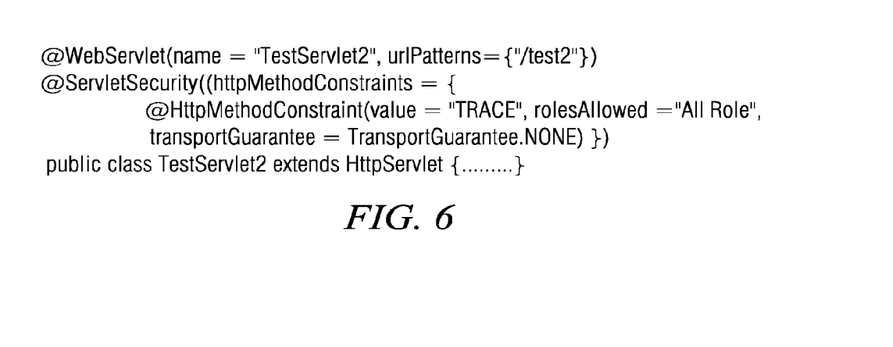
FIG. 6 illustrates a representative static security annotation.

FIG. 6 illustrates a representative static security annotation specified by the application developer.

Figure 7:
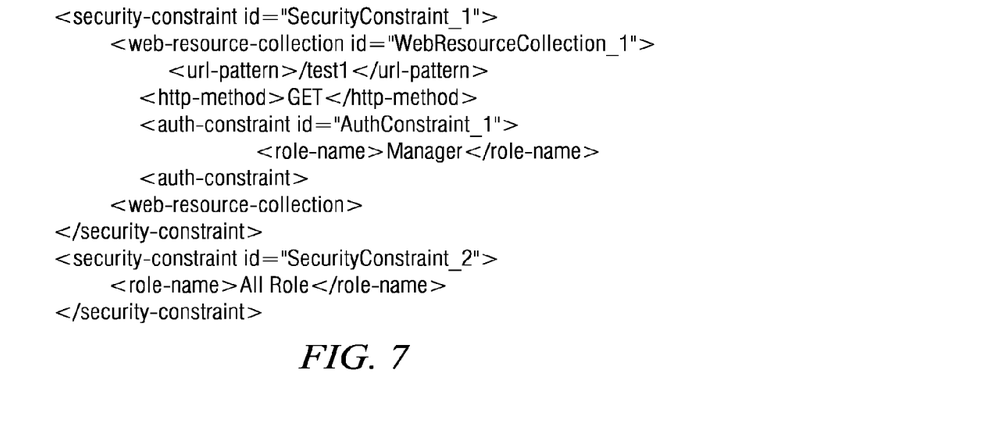
FIG. 7 illustrates a result of performing the first phase on the deployment descriptor file and static security annotation.

FIG. 7 illustrates a result of merging (step 410 in FIG. 4) the portion of the deployment descriptor (FIG. 5) with the @RoleAllowed static security annotation (FIG. 6). The resulting merged security constraints includes a list of the security roles defined in the servlet (be it through web.xml security constraints or static security annotations).

Figure 8:
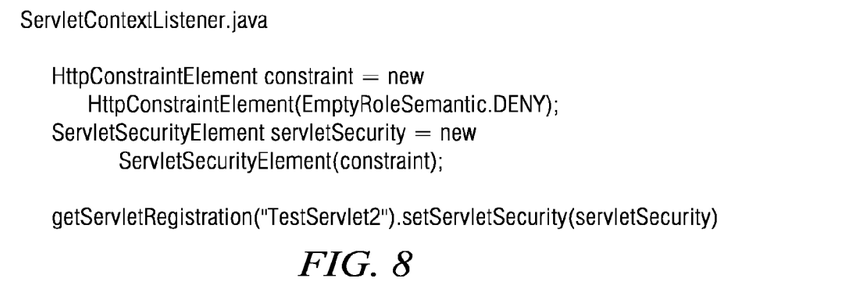
FIG. 8 illustrates a representative dynamic security annotation.

FIG. 8 illustrates a representative dynamic security annotation.

Figure 9:
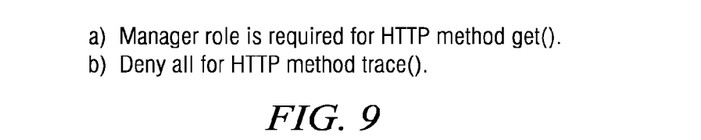
FIG. 9 illustrates a result of performing the second phase on the three (3) types of security constraints.

FIG. 9 illustrates of result of merging at runtime the three (3) sets of constraints (web.xml, static security annotations, and dynamic security annotations). The resulting merged security constraints are element 424 in FIG. 4. As can be seen, using the inventive technique, the order of precedence has been maintained correctly.

The Java™ Servlet 3.0 specification provides a number of security annotations and, for each such annotation, a MergeAction implementation is defined. An Annotations Metadata Manager (AMM) facility (implemented as software, executed by a processor) is used to implement a merge. In a known operation, the AM scans an enterprise archive (EAR) file when the application starts and calls MergeAction to merge the annotation(s) in the class with the deployment descriptor. The following discussion assumes the reader's familiarity with the enabling technologies and nomenclature set forth in the above-identified specification. In addition, familiarity with Java EE 5 and above is presumed.

One security annotation is the @ServletSecurity annotation. When an application deploys, the ServletSecurity MergeAction implementation finds all servlets with the ServletSecurity annotation. For each annotated servlet, it finds the servlet associated with the given class bass on the WebServlet annotation. The WebServlet annotation is used to define a Servlet component in a web application; this annotation is specified on a class and contains metadata about the Servlet being declared. If RolesAllowed in the ServletSecurity annotation is not found in the deployment descriptor, it then creates a role-name attribute for the role in the deployment descriptor. When an application starts, the WebContainer inspects all servlets with the ServletSecurity annotations, and it sets those annotations on a setServletSecurity( )method of a ServletRegistration annotation. The WebContainer then notifies the security component to inspect all ServletRegistration annotations that have URL patterns and security constraints. The security component then determines if a URL pattern is defined in the deployment descriptor. If one is not defined in the deployment descriptor, the security constraints a RunAs role in the URL pattern are created and then used. If an exact match is already defined in the deployment descriptor, the security constraints and RunAs role in the URL pattern of the deployment descriptor are used instead of the annotation data.

When no @HttpMethodConstraint element is specified, a @ServletSecurity annotation corresponds to a single security-constraint element containing a web-resource-collection that contains non http-method elements, and thus pertains to all HTTP methods. When one or more @HttpMethodConstraint elements are specified, the method independent constraint corresponds to a single security-constraint containing a web-resource-collection that contains an http-method-omission element for each of the HTTP methods named in the method-specific constraints. Each @HttpMethodConstraint corresponds to another security-constraint containing a web-resource-collection method containing an http-method element naming the corresponding HTTP method.

The security annotations include the @RolesAllowed security annotation. The RolesAllowed is a list containing the names of authorized roles. The MergeAction implementation finds all of the classes and methods with the RolesAllowed annotation. For each annotated class, it finds the Enterprise Java Bean (EJB) associated with the given class. It then finds the subset of MethodElements in the list of all the MethodPermissions defined in the deployment descriptor for this EJB. If a MethodElement with a wildcard method name is not found, and a wildcard method does not exist in the list of excluded methods or in the list of unchecked MethodElements, a new MethodPermission and MethodElement are created. If a MethodPermission for this EJB exists with exactly the same roles as those found in the annotation, this MethodPermission is used instead of creating a new one. For each role name specified in the annotation, a new SecurityRole is created and added to the SecurityRole list in the MethodPermission. If the MethodPermission was newly-created, it is added to the MethodPermission list in the deployment descriptor. The new MethodElement created is added to the MethodElement list of the MethodPermission. Similar processing is done for all annotated methods. Instead of a wildcard MethodElement, the method signature must exactly match the signature of the annotated method. Additionally, for each role name specified in the annotation, if the deployment descriptor list of security roles does not contain a SecurityRole with the annotated role name, a new SecurityRole also is created and added to this list of security roles.

The security annotations include @RunAs security annotation. The MergeAction implementation finds all the class with the RunAs annotation. For each annotated class, it finds the Servlet of the EJB associated with the given class. It then determines if a run-as element is defined in the deployment descriptor for the servlet or EJB. If one is not found, a new run-as element is created and added to the deployment descriptor. If a run-as element is found, this run-as element is used instead of creating a new one. The role name used in the RunAs annotation must be defined in the deployment descriptor.

Other security annotations include: @DeclareRoles, @DenyAll, and @PermitAll. The MergeAction implementation for @DeclareRoles finds all the classes annotated with this annotation. Within each annotated class for each role name specified, if the security roles listed in the deployment descriptor do not contain a SecurityRole with the annotated role name, a new SecurityRole is created and added to this list of security roles.

If the @DeclareRoles security annotation is used, then the roles should be pre-defined so that a user/group to role mapping can be carried out during deployment time.

The MergeAction implementation for @DenyAll finds all the methods annotated with the annotation. For each annotated method, if the method is not included in the deployment descriptor list of excluded methods, and a MethodPermission does not exist in the deployment descriptor, a new MethodElement is created and added to this list of excluded methods in the deployment descriptor.

The MergeAction implementation for @PermitAll finds all the classes and the methods with the annotation. For each annotated class, it finds the EJB associated with the class. It then searches the subset of the MethodElements in the list of all the MethodPermissions defined in the deployment descriptor for this EJB. If a MethodElement with a wildcard name is not found and a wildcard method does not exist in the list of excluded methods or in the list of MethodElements with security roles, a new MethodPermission and a new MethodElement are created. The new MethodPermission is marked unchecked and is added to the MethodPermission list in the deployment descriptor. The new MethodElement is added to the MethodElement list of the newly created unchecked MethodPermission. Similar action is done for all annotated methods. Instead of a wildcard MethodElement, the method signature must match exactly the signature of the annotated method.

Further details regarding these annotations are found in the Java™ Servlet 3.0 specification.

The @ServletSecurity annotation is mapped to the security-constraint as follows. When a metadata-complete attribute is set in the deployment descriptor, the @ServletSecurity annotation has no effect on security constraint. When a security-constraint in the deployment descriptor includes a URL pattern that is an exact match for a pattern mapped to a class annotated with @ServletSecurity, there is no effect on the constraint. Except for these exceptions, when a Servlet class is annotated with @ServletSecurity, the annotation defines the security constraints that apply to all the URL patterns mapped to all the Servlets mapped to the class.

While the disclosed technique has been described in the context of JEE Servlet 3.0 specification, this is not a limitation.

The subject matter described herein has many advantages. Developers can use annotations for securing web resources and be assured that all security constraints are handled (merged) correctly for an access decision. The described technique also provides that a list of roles is available at application deployment time to enable the entity deploying the application to map users to roles (role to user/group mapping). The technique also enables injection of security annotations for securing web resources, as well as the ability to use JACC with such dynamically-injected security annotations.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The secure web server itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the application server components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the realm name display control framework described above.

The security constraint merger functionality provided by the application server may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, Chrome or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a Web-based portal having a point of contact that provides authentication, session management and authorization, but this will be a typical implementation. As noted, the above-described function may be used in any system, device, portal, site, or the like wherein server-set session management data might be re-used (either by an original user in a different session, or by another user) through the same client browser. More generally, the described technique is designed for use in any operating environment wherein given information (including, without limitation, session management data) is not intended to persist across applications or sessions but ends up doing so because of patterns of client re-use and/or application-level granularity of session information.

Having described our invention, what we now claim is as follows.

The invention claimed is:

1. A method for merging security constraints associated with an application when using security annotations, comprising:
    during application deployment, generating a list of role names;
    during application runtime in an application server, retrieving security constraints for the application from a plurality of sources, the sources including dynamic and static security annotations, and a deployment descriptor; and
    using the list of role names and the security constraints retrieved from the plurality of sources to generate a set of merged security constraints having an order of precedence.

2. The method as described in claim 1 wherein the list of role names is generated by merging one or more security constraints in the deployment descriptor together with one or more security constraints in a static security annotation.

3. The method as described in claim 2 wherein the static security annotation is an @RoleAllowed static security annotation.

4. The method as described in claim 1 wherein the step of using the list of role names and the security constraints retrieved comprises:
    merging one or more dynamic security annotations with one or more static security annotations to generate a set of runtime constraints; and
    merging one or more security constraints from the deployment descriptor with the set of runtime constraints and the list of roles to generate the set of merged security constraints.

5. The method as described in claim 1 wherein the security constraints in the deployment descriptor are XML declared by an application developer.

6. The method as described in claim 1 wherein the application comprises one or more servlets.

7. The method as described in claim 6 wherein the one or more servlets conform to Java Servlet 3.0 specification.

8. Apparatus, comprising:
    a processor;
    computer memory holding computer program instructions that when executed by the processor perform a method for merging security constraints associated with an application when using security annotations, the method comprising:
        during application deployment, generating a list of role names;
        during application runtime, retrieving security constraints for the application from a plurality of sources, the sources including dynamic and static security annotations, and a deployment descriptor; and
        using the list of role names and the security constraints retrieved from the plurality of sources to generate a set of merged security constraints having an order of precedence.

9. The apparatus as described in claim 8 wherein the list of role names is generated by merging one or more security constraints in the deployment descriptor together with one or more security constraints in a static security annotation.

10. The apparatus as described in claim 9 wherein the static security annotation is an @RoleAllowed static security annotation.

11. The apparatus as described in claim 9 wherein the step of using the list of role names and the security constraints retrieved comprises:
    merging one or more dynamic security annotations with one or more static security annotations to generate a set of runtime constraints; and
    merging one or more security constraints from the deployment descriptor with the set of runtime constraints and the list of roles to generate the set of merged security constraints.

12. The apparatus as described in claim 9 wherein the security constraints in the deployment descriptor are XML declared by an application developer.

13. The apparatus as described in claim 9 wherein the application comprises one or more servlets.

14. The apparatus as described in claim 13 wherein the one or more servlets conform to Java Servlet 3.0 specification.

15. A computer program product in a non-transitory computer readable medium for use in a data processing system, the computer program product holding computer program instructions which, when executed by the data processing system, perform a method for merging security constraints associated with an application when using security annotations, the method comprising:
    during application deployment, generating a list of role names;
    during application runtime, retrieving security constraints for the application from a plurality of sources, the sources including dynamic and static security annotations, and a deployment descriptor; and
    using the list of role names and the security constraints retrieved from the plurality of sources to generate a set of merged security constraints having an order of precedence.

16. The computer program product as described in claim 15 wherein the list of role names is generated by merging one or more security constraints in the deployment descriptor together with one or more security constraints in a static security annotation.

17. The computer program product as described in claim 15 wherein the static security annotation is an @RoleAllowed static security annotation.

18. The computer program product as described in claim 15 wherein the step of using the list of role names and the security constraints retrieved comprises:
    merging one or more dynamic security annotations with one or more static security annotations to generate a set of runtime constraints; and
    merging one or more security constraints from the deployment descriptor with the set of runtime constraints and the list of roles to generate the set of merged security constraints.

19. The computer program product as described in claim 15 wherein the security constraints in the deployment descriptor are XML declared by an application developer.

20. The computer program product as described in claim 15 wherein the application comprises one or more servlets.

21. The computer program product as described in claim 20 wherein the one or more servlets conform to Java Servlet 3.0 specification.

22. A method for applying security constraints associated with an application when using security annotations, the application comprising at least one Java servlet, comprising:
    during application runtime at an application server, retrieving security constraints from a plurality of sources, the sources including dynamic and static sources, wherein the static sources comprise a deployment descriptor, and a static security annotation;
    determining an order of precedence of the security constraints according to a list of roles for the Java servlet, wherein the list of roles is determined at application deployment; and
    in response to a request, applying the security constraints to the request in the order of precedence.

23. The method as described in claim 22 wherein the list of roles for the Java servlet is determined by merging one or more security constraints from the deployment descriptor with an @RolesAllowed static security annotation.

\* \* \* \* \*